United States Patent [19]
Miller

[11] 3,857,642
[45] Dec. 31, 1974

[54] FLEXIBLE OR UNIVERSAL COUPLING MEANS

[75] Inventor: Bernard F. Miller, Corning, N.Y.

[73] Assignee: Ingersoll-Rand Company, New York, N.Y.

[22] Filed: Feb. 26, 1973

[21] Appl. No.: 336,088

[52] U.S. Cl............... 403/57, 403/112, 403/361, 92/129
[51] Int. Cl............................................ F16b 9/02
[58] Field of Search .......... 403/240, 243, 263, 350, 403/351, 361, 112, 52; 308/72, 172; 92/129, 187, 256

[56] References Cited
UNITED STATES PATENTS

| | | | |
|---|---|---|---|
| 2,436,908 | 3/1948 | Van Weenen et al. | 92/187 UX |
| 3,301,610 | 1/1967 | Packett et al. | 308/72 X |
| 3,670,630 | 6/1972 | Tyson et al. | 403/361 X |

*Primary Examiner*—Richard J. Scanlan, Jr.
*Assistant Examiner*—Wayne L. Shedd
*Attorney, Agent, or Firm*—Bernard J. Murphy

[57] ABSTRACT

The means flexibly or universally couple two members, that motion will be imparted from one to the other, and includes a first assembly which engages a portion of one member, and a second assembly which clamps the first assembly to the second member. An adapter is abuttingly interposed between surfaces of the two members; the adapter allows for universal movement of the members, and defines a slidable interface with a surface of one member. An annular plastic ring, disposed about the one member, resiliently constrains the latter against sliding across the adapter.

4 Claims, 1 Drawing Figure

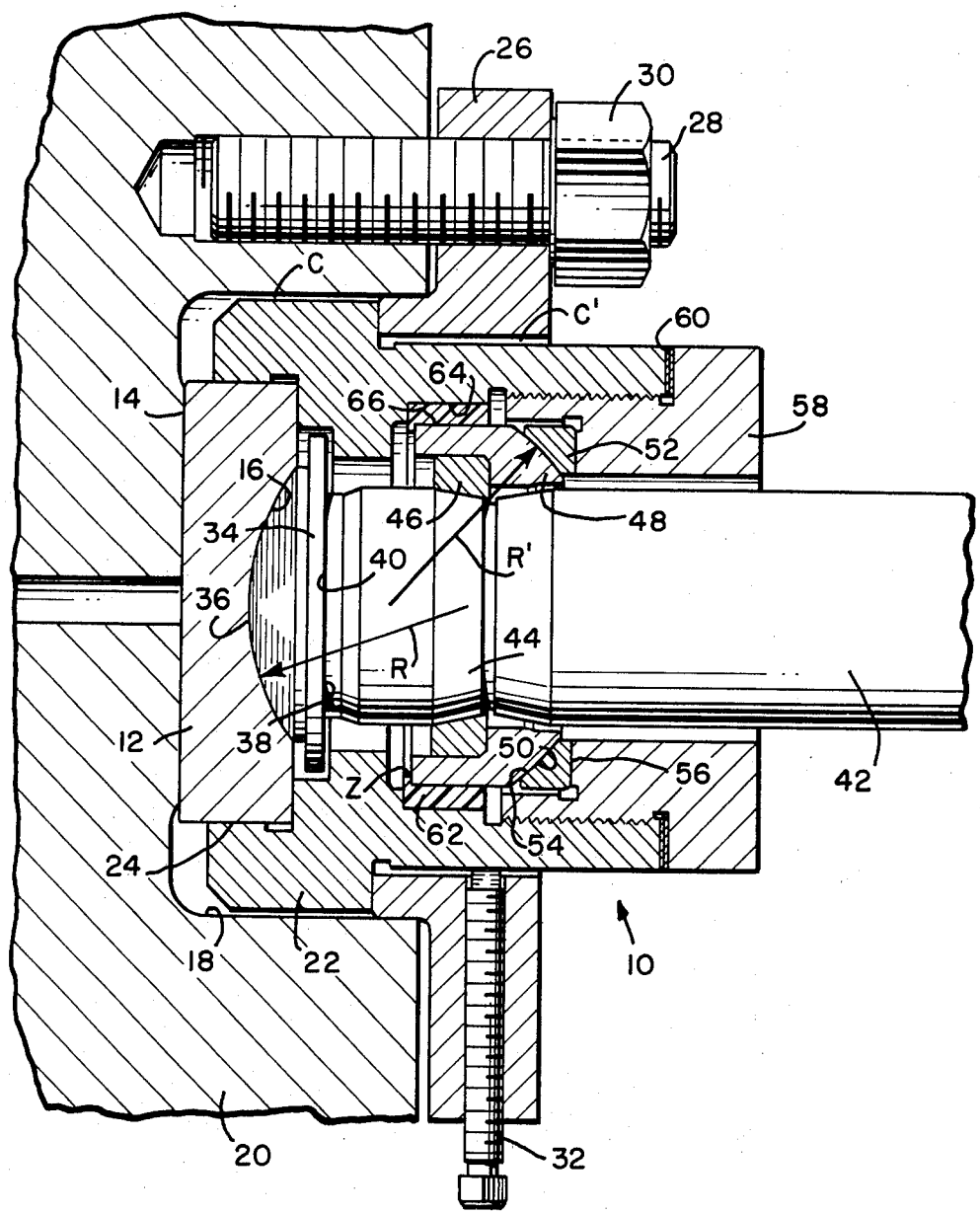

FLEXIBLE OR UNIVERSAL COUPLING MEANS

This invention pertains to means for coupling members for imparting motion from one member to the other, and in particular to such coupling means which accommodate flexible or universal movement between the members. Further, the novel coupling means provide for relative slidable motion between the members as well. The invention has particular utility in high pressure compressors which employ singleacting plungers, but may be used for plunger or piston rod connections on any compressor, or like machinery.

Universal coupling means are already known in the prior art, and typical among the known types is that comprised by U.S. Pat. No. 3,670,630; issued June 20, 1972; to Henry K. Tyson, et al.; for "Resilient Connecting Means." In this connecting means, the patentees set forth a universal coupling means, but teach no provisioning for resiliently constraining any one of coupled members against slidable movement relative to a "universal" adapter with which they are abuttingly engaged.

The reference, U.S. Pat. No. 3,670,630, teaches the optional use of a deformable or resilient insert about one member soley for the purpose of initial alignment of the components on assembly. The patentees clearly specify that such an inert, which may be ". . .bronze, lead, and alloys thereof . . . ," ". . . is optional, and merely aids in initial alignment."

On the authority of the patentees, then, their deformable or resilient insert is of such dimension, or is so emplaced, that if it ". . .merely aids in initial alignment. . . ," it serves no other function. Such an inert, of course, could be hollow; more, it likely has a loose, sliding fit within the "gland" in which it is placed. As to this, the patent does not specify.

The instant invention teaches an improved coupling means neither anticipated nor suggested by U.S. Pat. No. 3,670,630, nor by any other known reference. This invention sets forth an unexpected benefit to be derived from the use of such an insert, or the like, which escaped the attention of those skilled in this art.

Specifiically, it is an object of this invention to set forth universal coupling means having means for resiliently constraining at least one of two coupled members against slidable movement relative to a "universal" adapter with which they are abuttingly engaged.

Another object of this invention is to teach a means for universally coupling first and second members together, for imparting movement from one of said members to the other thereof, comprising adapter means for interpositioning between said members for effecting an abutting engagement of surfaces of said adapter means with a surface of each of said members; and means for engaging a portion of a first one of said members, and for clamping said members together by holding said members in said surfaces abutting engagement with said adapter means; wherein said adapter means has means responsive to universal movement between said members for maintaining said surface abutting engagement of said members with said adapter means, in cooperation with said clamping means; and said clamping means includes means for resiliently constraining one of said members against slidable movement of said surface thereof across said surface of said adapter means.

A feature of this invention comprises means for universally coupling two members, that motion will be imparted from one to the other, and includes a first assembly which engages a portion of one member, and a second assembly which clamps the first assembly to the second member. An adapter is abuttingly interposed between surfaces of the two members; the adapter allows for universal movement of the members, and defines a slidable interface with a surface of one member. An annular plastic ring, disposed about the one member, resiliently constrains the latter against sliding across the adapter.

Further objects and features of this invention will become more apparent by reference to the following description taken in conjunction with the accompanying FIGURE, the same being an axial cross-sectional view of an embodiment of the invention.

As depicted in the FIGURE, an embodiment of the novel coupling means 10, comprises a thrust block 12, which has a flat surface 14 on one side and a spherically formed or concave surface 16 on the opposite side. This block 12 is secured in a pocket 18 formed in the nose of a crosshead 20 by a sleeve 22 which is closely fitted about the outer surface 24 of the block. The sleeve 22 is fixed to the crosshead 20 by a clamping flange 26 which is bolted to the crosshead 20 by a plurality of equally spaced studs 28 and nuts 30 (only one of each being shown). The clamping flange 26 is registered in the pocket 18 of the crosshead 20 with a small clearance, but the sleeve 22 has a comparatively large clearance C and C' about its outer surfaces to allow it to be initially centered up by jackscrews 32 threadedly carried in the clamping flange 26.

Mated to the thrust block 12 is an adapter 34, which has a convex surface 36 on one side, and a flat surface 38 with which an end 40 of a plunger 42 mates —for transferring axial plunger loading to the crosshead 20. The plunger 42 has a tapered recess 44 which receives a split tapered ring 46. This split ring 46 is held in place by a guide ring 48 which has a convex surface 50 on one end. The guide ring 48 is closely fitted with the split ring 46 and is mated with a seat ring 52 which has a concave surface 54 on one side and a flat surface 56 on the other. Both of these parts, rings 48 and 52, are formed of hardened steel, as well as the thrust block 12 and adapter 34. Axial movement of the assembled components is restrained by a lock nut 58 which is threaded into the sleeve 22. Axial movement of plunger 42 is controlled by shims 60, interposed between nut 58 and sleeve 22, the same being used to set the clearance for the assembled parts.

Excepting for the use of the shims 60, which is not possible in coupling means such as those exemplified in U.S. Pat. No. 3,670,630, the novel means just described is fairly well known. However, where the cited reference employs resilient means to urge the plunger (such as plunger 42) towards the adapter (such as adapter 34), the present invention securely sets a fixed, axial-movement limit for the plunger 42, relative to the adapter 34, by the shims 60 and lock nut 58.

As is well known from the prior art, surfaces 16 and 36 accommodate for a slueing or universal movement of the plunger 42 or crosshead 20 relative to each other. However, in machine use, or through poor manufacturing tolerancing, plunger 42 may seek to displace itself in a transverse direction, relative to its own longitudinal axis. Now, if this displacement is not resiliently met, the plunger 42 can become unduly strained, or the machine in which the coupling means 10 is employed can become unbalanced.

As noted earlier, the prior art suggests the use of deformable, or otherwise, "inserts" merely as aids in initial alignment of the coupling means components on assembly. Of course, in serving this purpose only, such inserts may be hollow, annular rings, or a pair of fragmentary sectors joined by filamentary, semi-circular webs, or whatever. According to this invention, in one embodiment, an annular ring 62, of solid cross-section, and of polytetrafluoroethylene material, is shrunk into sleeve 22, on assembly. Thus, following assembly, and in the presence of heat generated by use of the coupling means 10, the ring 62 freely expands, resiliently to press against a recessed seat 64 of sleeve 22 and interfacing surface 66 of ring 48. By exaggeration, but for expository purposes, an end portion of the ring 62 is shown expanded at Z over an end of ring 48. As noted, this expansion Z is shown exaggeratedly. Such expansion does obtain, but is not so readily visible.

Now then, ring 62 resiliently constrains the plunger 42 against a slidable movement of the surface 40 thereof across the surface 38 of adapter 34. Thus, displacement of the plunger 42 transverse to its axis is resiliently met —that the plunger 42 will not become strained from axial mis-alignment.

The spherical radius R of the thrust block 12 has its centroid at approximately the centerline of ring 46, in a vertical direction, and on the centerline of the plunger 42 axially. The ring 62 is also located approximately on this centerline of the ring 46.

On initial assembly, the plunger 42, and the assembly of associated rings, are positioned radially by use of the jackscrews 32 in the clamping flange 26 and then the sleeve 22 and the clamping flange 26 are tightened by the studs 28 and nuts 30. The plunger 42, adapter 34, split ring 46, guide ring 48, seat ring 52 and lock nut 58 are positioned axially by use of the shims 60. This is accomplished by assembling the parts without the shims 60 and tightening the lock nut 58 finger tight. A gap obtaining between the lock nut 58 and sleeve 22 is measured with feeler gages, and the shims are then sized to this thickness, plus a further, slight amount. This shimming is then inserted, and the lock nut 58 is pulled up tight with a spanner wrench (in holes provided, but not shown). This tightening will reduce the axial clearance of the parts to give just enough clearance for freedom of the parts but without a chucking motion.

During operation, if the plunger 42 tends to move in an angular position, it will cause the thrust block adapter 34 to slue in the thrust block 12. Also, the guide ring 48 which has a radius R' (from its convex surface 50) equal to that of the thrust block 12, but from a slightly different locus, will rotate in the concave surface 54 of the seat ring 56. This motion, which is normally very slight, will be absorbed by the resiliency of ring 62.

If the plunger 42 tends to move off its axial centerline, in a straight line, it will side on the flat surface 38 of the adapter 34, and, the seat ring 52 will move in a radial direction relative to the nut 58. The ring 62 will yield, resiliently, under the mechanical force of this movement, avoiding any undue strains on the plunger.

While I have described my invention in connection with a specific embodiment thereof, it is to be clearly understood that this is done only by way of example, and not as a limitation to the scope of the invention as set forth in the objects thereof and in the appended claims.

I claim:

1. Means for universally coupling first and second members together, for imparting movement from one of said members to the other thereof, comprising:

a thrust block element;

an adapter element;

one of said elements having a convex surface formed thereon; and the other of said elements having a concave surface formed thereon;

said elements having said surfaces in contacting engagement, defining a universally movable interface;

said interfaced elements being interpositioned between said first and second members, effecting a continuous abutting engagement of surfaces of said members with surfaces of said elements; and a clamping assembly, engaging a portion of one of said members and fastened to the other of said members, clamping said elements and members together, locking said elements and members in continuous contacting and abutting engagement and preventing said elements and members from moving apart and separating from each other; wherein said clamping assembly includes a threaded sleeve, a plurality of rings enclosed by said sleeve and disposed about said portion of said one member, said one member having a surface deformation formed thereon and one of said rings is in engagement with said deformation, a lock nut threadedly engaged with said sleeve and forcefully clamping said rings together and locking said one ring against said surface deformation, and a resilient annulus radially interpositioned between said sleeve and another of said rings, said annulus having surfaces thereof in resiliently compressed engagement with surfaces of said sleeve and said another ring, resiliently limiting said one member in a slidable, radial movement only relative to said other member;

said another ring encloses said one ring; and said plurality of rings includes a seat ring interpositioned between said another ring and said nut.

2. Coupling means, according to claim 1, wherein:

said one ring comprises a split collar;

said another ring comprises a generally cup-shaped guide ring having an annular wall; and said split collar is enclosed by said wall.

3. Coupling means, according to claim 1, wherein:

said another ring comprises a guide ring having an annular, convex surface;

said seat ring has an annular concave surface;

said convex and concave surfaces of said rings are in interfaced, contacting engagement.

4. Coupling means, according to claim 2, wherein:

said resilient annulus envelops said wall.

* * * * *